Feb. 5, 1952          A. F. HAYEK          2,584,267

AUTOMATIC PLOTTING BOARD AND PROJECTING MEANS

Filed Feb. 17, 1949          2 SHEETS—SHEET 2

Inventor
ARTHUR F. HAYEK
By *H. S. Mackey*
Attorney

Patented Feb. 5, 1952

2,584,267

UNITED STATES PATENT OFFICE 2,584,267

AUTOMATIC PLOTTING BOARD AND PROJECTING MEANS

Arthur F. Hayek, Pleasantville, N. Y., assignor to General Precision Laboratory Incorporated, a corporation of New York Application February 17, 1949, Serial No. 76,890

7 Claims. (Cl. 88—24)

This invention pertains to automatic plotting boards for projection presentation and solution of dynamic problems involving simultaneous motions of several objects in a plane.

A board of this type is designed to receive simultaneously data representing the rectangular coordinates of a number of objects continuously moving in a plane, to plot automatically on a small plotting board or plate the points defined by the data, and to project an image of the plotting plate onto a screen for viewing by a group of persons during the actual plotting.

The input data may be artificially generated to simulate moving objects, in which case each set of data is generated in some form of data generator in which, for instance, the speed and direction of motion in a plane are set manually, and from which are automatically evolved by the data generator two varying electrical potentials, one representative of the X-axis coordinate of the moving object and the other the Y-axis coordinate. These two varying electrical potentials are transmitted to the automatic plotting board and constitute one set of input data.

An automatic plotting board can also be used for illustration before an audience of a static situation when it is desired to draw or spot on the screen successive elements of the situation. When the automatic plotting board is so used it employs but one set of input data. These data are generated at a plotting device having a glass sheet for placement over a map, and a manually-operated pointer arranged to be moved about at will over the surface of the map. When the pointer is so moved it actuates two potentiometers, one representing X-axis movements and the other Y-axis movements, and the output potentials of these potentiometers are received as data by the plotting board.

The automatic plotting board of the instant invention comprises a plotting plate arranged to be optically projected, optical projection equipment and a screen, a plotting pin and carriage for marking the plotting plate, servo equipment for positioning the plotting pin and carriage in accordance with the input data, timing and sequencing equipment for connecting the several data input channels successively to the servo equipment, and input terminals for connection to external input data circuits. As many input channels as may reasonably be desired can be employed with the instant invention, but to avoid repetitiousness one channel is described in some detail with only a general description of additional channels.

The purpose of this invention is the provision of means for the optical projection on a screen of data representing the motion of a number of objects in a plane, and for recording the paths which these objects have taken, thus depicting graphically to an audience the changing time and space relationships of the moving objects.

The exact nature of this invention will be more clearly understood from consideration of the following detailed description in connection with the attached drawings, in which.

Figure 1:
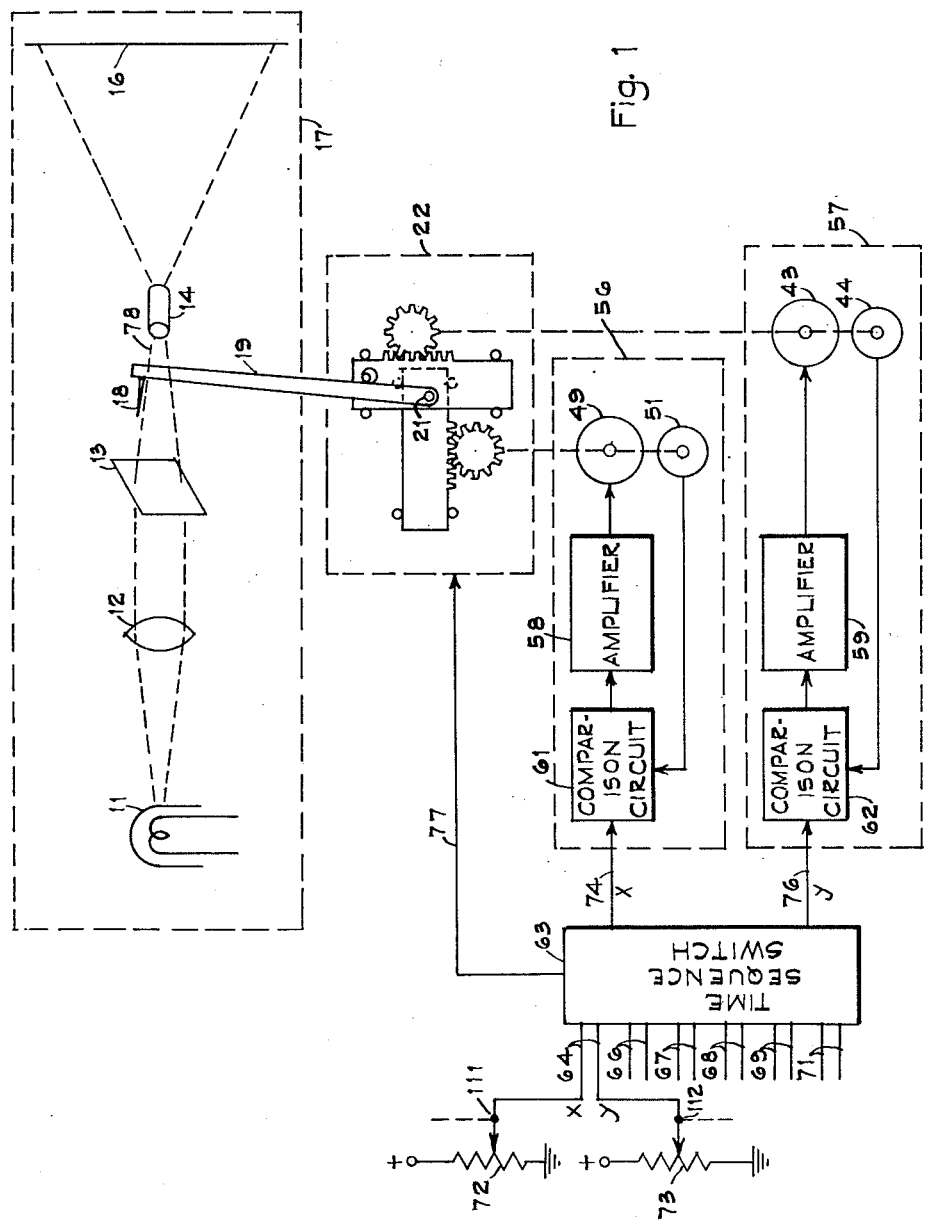
Figure 1 is a diagrammatic illustration of the system of the invention.

Referring now to Fig. 1 an optical projection system 17 consists of a light source 11, a collimating lens 12, a projection lens 14 and a screen 16 upon which an enlarged image of a transparency 13 is to be displayed. The transparency 13 is placed at the focus of the lens 14 and constitutes the plotting board or plotting plate of this invention. Upon it are plotted the input data point by point, and as these points are plotted they are simultaneously projected by the optical system and appear as points of light upon the screen 16.

The transparency 13 may initially be transparent and may in the course of plotting receive on its surface opaque dots representing datum points. In this case the out-of-focus shadow of the plotting arm 19 will be projected as a blurry shadow upon the screen 16. Alternatively, the transparency may initially have an opaque surface and during the plotting may be pierced to permit light to shine through the pierced spots to indicate the datum points. The latter type of transparency is preferred and is chosen for illustration because the projection of the shadow of the plotting arm 19 is minimized. Such a transparency may be made, for example, by coating a flat piece of glass four inches square and one-eighth inch thick with a solution of aniline black dissolved in artists' fixative in the proportion of two ounces of aniline black to one pint of fixative. The fixative may consist of two ounces of gum damar in 16 ounces of benzene. This prepared solution is placed on one side of the glass by spraying and drying in several successive layers, so as to form a completely opaque skin.

This transparency, slide or plotting board 13 may also be prepared in numerous other ways, employing opaque coatings of other compositions.

The opaque slide so prepared and constituting the plotting board or plate of this invention is slid into grooves of the automatic plotting board so that the slide is illuminated by collimated rays from the lamp 11 in the focal plane of the lens 14 and with the coated side of the plotting board facing the screen 16. The automatic plotting is done by a sharp point or plotting pin 18 arranged to strike sharp blows on the coated surface of the board, so that at each blow the coating is pierced and its opacity at the point is destroyed, causing the glass plotting board or slide to become transparent at that point and allowing light from the lamp 11 to shine therethrough and to be projected as a small spot of light on the projection screen 16. The point 18 is preferably of hardened steel sharpened to a slightly rounded point similar to that of a phonograph needle, of such diameter and shape that the resulting projected small spot of light is smoothly circular and is large enough to be clearly visible to the audience. Alternatively the striking point may be made in any other distinctive shape, and then, by employment of a number of striking points, each energized by an individual set of data, the paths of the several objects can be identified on the screen, for each path will consist of a line of dots of distinctive shape. The needle point is carried on the end of a striker bar 19 hinged and retracted by a fulcrum sheet or spring hinge 21 on a carriage mechanism 22. This mechanism is more clearly shown in Fig. 2. Its function is to move the striker rod in both the X and Y axes thereby putting the point 18 into position to strike any spot within the active area of the plotting board 13, and to enable the point 18 to strike that spot.

Figure 2:
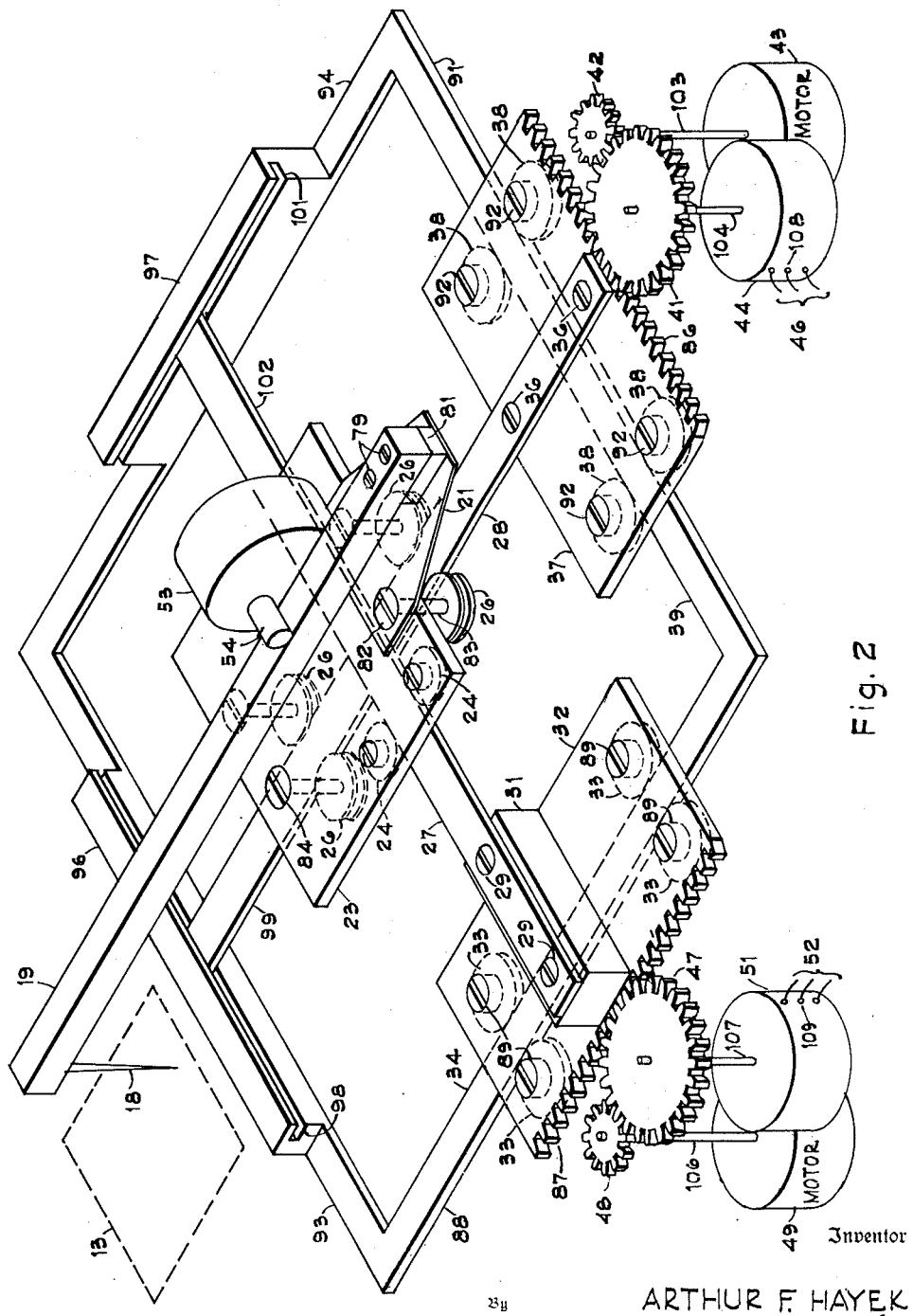
Figure 2 is an illustration of the cross slide and striker employed in the system of Fig. 1.

In Fig. 2, parts functionally like those of Fig. 1 being numbered alike, the point 18 is firmly fastened in one end of a striker rod 19. This striker rod is shown in Fig. 1 as vertical and as projecting into the path 78 of the light rays in such position in the vicinity of the vertical plotting plate 13 that when the plotting pin 18 is energized it strikes a horizontal blow on the vertical plate 13. In Fig. 2 the same plotting pin 18 and plotting plate 13 are shown but for convenience are shown with the plotting plate 13 in a horizontal position and with the plotting pin 18 near but not touching the plate and in position to strike it vertically when the plotting pin is energized. The striker rod 19 at the end opposite to that carrying the plotting pin 18 is firmly attached by the two screws 79 and nuts (not shown) through a spacing block 81 to a fulcrum strip 21. This fulcrum strip 21 is made of clock spring steel approximately .020 inch in thickness and of such width that its stiffness is adequate to support the striker bar 19 in a definite position of rest, but flexible enough so that it may act as a fulcrum or hinge through which the striker bar 19 may be forced to rotate sufficiently for the plotting pin 18 to strike and mark the coated surface of the plotting plate 13. When the striking force is removed from the striker bar 19 the stiffness of the fulcrum strip restores the striker bar and the plotting pin carried by it to the previously occupied definite position of rest with the plotting pin out of contact with the plotting plate.

The fulcrum strip 21 is firmly fastened by two machine screws 82 (one being concealed in Fig. 2 by the striker bar 19) to a rigid metal carriage plate 23 approximately four inches square and thick enough to be inflexible. The carriage plate is in turn supported so as to be independently slidable in two mutually perpendicular directions on two strips 27 and 28. The strip 28 is supported by four rollers 26 each carried on a rod 83. Each rod 83 is reduced in size at its lower end and pressed into the hub of its respective roller 26. The upper end of each rod is drilled and tapped for a machine screw 84 or 82 by which the rod is firmly fastened to the carriage plate 23. Each roller consists of an anti-friction bearing to the outer surface of the outer race of which has been pressed a double-flanged rim. These flanges embrace the edges of the strip 28 to secure the carriage plate 23 against vertical and lateral movement on its supporting strip 28. The carriage plate 23 is similarly supported on the strip 27 by four rollers 24 of similar construction.

The two strips 27 and 28 are positioned at right angles to each other and lie in two planes one above the other both being parallel to the plane of the carriage plate 23, the strip 27 being immediately beneath the carriage plate 23 and the strip 28 being lower by the length of the rods 83. The strip 28 is rigidly fastened by the machine screws 36 to a rack strip 37 having rack teeth along its edge 86. The strip 27 is rigidly fastened through a spacing block 31 by means of the machine screws 29 which in turn are fastened to a rack strip 32 having rack teeth along its edge 87. The vertical dimensions of the spacing block 31 are equal to the lengths of the four spacing rods 83 which support the carriage plate 23 on and space it from the strip 28 so that the two rack strips 32 and 37 lie in one plane.

Both rack strips are supported by and slide along sides of a frame 39 which is rigidly attached to and supported by the frame of the automatic plotting board. This frame 39 is approximately a plane rectangle composed of strip metal, on two adjacent sides of which are supported the rack strips 32 and 37. The rack strip 32 is confined to a longitudinal sliding motion along the side 88 of the frame 39 by four rollers 33 attached to the rack strip by four screws 89. Each roller consists of an anti-friction bearing which has pressed onto the outer surface of its outer race a single-flanged rim designed so that the flange embraces the frame strip 88 on the side opposite to that in contact with the rack strip 32, so that separation of the rack strip and frame strip and lateral movement are prevented. Similarly, the rack strip 32 is confined to a longitudinal sliding motion along the side 91 of the frame 39 by four rollers 38 similarly constructed and secured to the rack strip 37 by four machine screws 92. The angle formed by the two frame side strips 88 and 91 is 90°, therefore the directions of the longitudinal sliding motions of the rack strips 32 and 37 are mutually perpendicular.

The side 93 of the frame 39 has affixed thereto, by brazing or otherwise, a block 96 containing a slot 98 into which the end 99 of the strip 28 is slidably fitted. Likewise the side 94 of the frame 39 has affixed thereto a similar block 97 provided with a slot 101 into which the end 102 of the strip 27 is slidably mounted. These blocks thus provide support for the ends of the strips to improve the stability of the carriage plate 23.

A speed-reduction gear train and motor for moving the rack 86 are schematically represented by the electric motor 43, which may be called the Y-axis motor, the pinion 42 carried by the motor shaft 103, and the meshing idler gear 41 which in turn meshes with the rack 86, so that the rack is moved in a direction, at a speed and by an amount controlled by the motor rotation. The motor 43 is operated by and is a part of a servomechanism to be referred to hereinafter. A feedback potentiometer 44 having output terminals 46 also constitutes a part of this servomechanism and is connected by the shaft 104 to the idler gear 41, which rotates the potentiometer and consequently results in the production of the potentiometer slider terminal 108 of a potential representative of the position of the rack strip 37.

A similar speed-reduction gear train and motor for moving the rack 87 are schematically represented by the electric motor 49, which may be called the X-axis motor, the pinion 48 carried by the motor shaft 106, and the meshing idler gear 47 which in turn meshes with the rack 87, so that the rack 87 is moved in a direction, at a speed by an amount controlled by the motor rotation. The motor is operated by and is a part of a servomechanism to be referred to hereinafter. A feed back potentiometer 51 having output terminals 52 also constitutes part of this servomechanism and is connected by the shaft 107 to the idler gear 47, which rotates the potentiometer and consequently results in the production at the potentiometer slider terminal 109 of a potential representative of the position of the rack strip 37.

A rotary solenoid diagrammatically represented by the member 53 is secured to the carriage plate 23 and has an operating arm 54 positioned adjacent to and bearing against the striker bar 19. This rotary solenoid 53 is electrically operated through a circuit indicated by conductor 77 in Fig. 1 from the time sequence switch in a manner and at times to be described hereinafter.

When so operated the arm 54 is forceably rotated against the striker bar 19 and the striker bar is in turn rotated about a center intermediate the point of contact of the operating arm 54 and the point of fastening the striker bar to the spring strip 21 with such force that the pin 18 strikes the plate 13 and pierces its coating. The spring strip 21 being resilient permits this motion while at the same time presenting a force in opposition thereto so that the striker bar 19 is returned to its original position when the rotary solenoid 53 is deenergized.

Returning to Fig. 1, motors 49 and 43 constitute the X- and Y-axis motors of Fig. 2 and hence are accorded the same reference characters, and constitute components of the respective X-axis and Y-axis servomechanisms indicated by the dotted rectangles 56 and 57. These servomechanisms constitute the means for positioning the carriage plate in the two axes in accordance with input signals. The servomechanisms 56 and 57 are similar and may be of the type described in the copending application Serial No. 768,358, filed August 13, 1947, of Clarke M. Gilbert, now Patent No. 2,486,357 issued October 25, 1949, although those skilled in the art will understand that other forms may be used with equal facility. Each servomechanism consists in general of an amplifier 58 and 59, the output of which is applied to a motor, 49 and 43, and the input of which consists of an "error signal" derived from a comparison circuit 61 and 62 which may include a vibrating reed type of converter. In each servomechanism a feedback loop includes a potentiometer 51 and 44 operated by its respective output motor so that a potential representative of a coordinate of the position of the carriage plate is fed back to its respective comparison circuit.

Each comparison circuit is primarily energized through a time sequence switch 63 from any one of several sources represented in Fig. 1 by pairs of connectors 64, 66, 67, 68, 69 and 71 for electrical connection to these sources. One such source is indicated by the potentiometers 72 and 73 connected to the conductors 64, the potentiometers 72 and 73 acting to introduce the desired X and Y components into the system.

The time sequence switch 63 connects each of the sources in turn to the X-axis and Y-axis servomechanisms through conductors 74 and 76 so that while each source is connected its data are transmitted to the plotting board and the other sources have no effect on the board. It is necessary to maintain the connection between a source and the servomechanisms long enough to allow the cross slide mechanism of Fig. 2 to traverse the maximum X-axis and Y-axis distances that are possible in each axis from one side to the opposite side of the board, and to give time for the plotting pin to strike the glass plotting board. Conductor 77 constitutes the electrical connection from the time sequence switch 63 to the carriage mechanism 22 which supplies the striking signal thereto. This signal is produced by actuation of the switch and energizes the rotary solenoid 53 (Fig. 2) which in turn operates the striker bar 19. Experience indicates that one second of time is sufficient for both the positioning and the marking operations, so that all six sources may be connected in turn and one cycle of plotting completed in six seconds.

The time sequence switch may be of any type which satisfies these requirements. For instance, it may consist of a series of split collector rings operated through gearing by an electric motor so that each input data conductor pair is connected in succession to the servomechanism for about one second, and the rotary solenoid 53 (Fig. 2) is electrically energized near the end of each one-second period. Associated with each input data circuit is a switch by which that particular circuit may be cut out, so that for instance in the model employed for illustration, any number of input circuits from two to six may be used. Numerous alternative constructions of the time sequence switch may also be used as will be readily apparent to one skilled in the art such as relay chains and the like.

The complete operation of the automatic plotting board begins with the continuous reception of changing potentials by all active input data channels 64 to 71, Fig. 1. The X-axis and Y-axis portions of each channel are connected respectively to the X-axis servomechanism 56 and the Y-axis servomechanism 57 by the time sequence switch 63, each channel being connected in turn and the cycle repeated indefinitely. During connection of the channel 64, the slider 111 is or may be under continuous readjustment by an external X-axis coordinate signal generator, so that a changing potential is presented through the conductor 74 to the servomechanism 56. The latter amplifies and reproduces this changing potential as a mechanical rotation instantly representative in amount and direction of the instantaneous amount and sense of the input potential and this rotation is in turn translated by the gears 48, 47 and rack 87, Fig. 2, to a mechanical translation of the position of the strip 27 in a direction normal to its length.

When the strip 27 is so moved the carriage plate 23 and the striker bar 19 carried thereby are constrained to move in the same direction, the carriage plate 23 moving along the length of the strip 28 on the rollers 26. This movement results in the striker pin 18 being moved in the X-axis direction over the plotting plate 13.

Similarly adjustment of the slider 112 of the potentiometer produces an "error signal" which being impressed on the input of the servomechanism 57 results in a corresponding rotation of the Y-axis motor 43. The rotation of this motor acting through the gear train 42 and 41 and the rack 37 causes the strip 28 to be moved in a direction normal to its length and this strip carrying the carriage plate 23 and the striker bar 19 along with it causes the striker pin 18 to be moved over the plotting plate 13 in the Y-axis direction.

Sufficient time having been allotted for the striking pin 18 to be located in the proper position over the plotting plate 13, the time sequence switch 63 acts to energize the solenoid 53 and the pin 18 strikes the plotting plate piercing a hole in its coating at a location representative of the coordinate data impressed on the channel 64 through actuation of the potentiometers 72 and 73. Immediately thereafter the time sequence switch disconnects the channel 64 and connects the next channel to the two servomechanisms and the action is repeated.

Obviously where only one set of input data is used, the time sequence switch may be eliminated and the striking solenoid actuated in any desired manner so that continuous and discontinuous lines may be drawn on the plotting board. In such a case the potentiometers 72 and 73 may be controlled by the position of a single stylus or other positioning member through a mechanism as illustrated in Fig. 2, the manual motion of the stylus communicating the X- and Y-axis coordinate data position and actuated in the manner of the potentiometers 44 and 51. In such cases of course maps, hand-written data and the like may be transmitted to the plotting plate 13.

What is claimed is:

1. In a device of the character described, a plurality of pairs of input circuits each comprising means for producing a first electrical potential whose amplitude is a function of position in one coordinate of direction and means for producing a second electrical potential whose amplitude is a function of position in another coordinate of direction, a first motor, a first control circuit operable by a selected one of said first electrical potentials positioning said first motor in accordance with the amplitude of said selected one of said first electrical potentials, a second motor, a second control circuit operable by a selected one of said second electrical potentials positioning said second motor in accordance with the amplitude of said selected one of said second electrical potentials, means for sequentially connecting respective ones of said pairs of input circuits to the respective first and second control circuits, a stylus, means for positioning said stylus by the conjoint operation of said first and second motors, a plotting plate, means for causing said stylus periodically to contact said plotting plate in timed relation to the operation of said sequential connecting means to inscribe a positional plot thereon, and means for projecting the plot so inscribed.

2. In a device of the character described, a plurality of pairs of input circuits each comprising means for producing a first electrical potential whose amplitude is a function of position in one coordinate of direction and means for producing a second electrical potential whose amplitude is a function of position in another coordinate of direction, a first motor, a first control circuit operable by a selected one of said first electrical potentials positioning said motor in accordance with the amplitude of said selected one of said first electrical potentials, a second motor, a second control circuit operable by a selected one of said second electrical potentials positioning said second motor in accordance with the amplitude of said selected one of said second electrical potentials, means for sequentially connecting respective ones of said pairs of input circuits to the respective first and second control circuits, a stylus, means for positioning said stylus by the conjoint operation of said first and second motors, a plotting plate having an opaque coating thereon removable by contact with said stylus, means for causing said stylus periodically to contact said plotting plate in timed relation to the operation of said sequential connecting means to inscribe a positional plot thereon and means for projecting the plot so inscribed.

3. In a device of the character described, a carriage member, means including a first motor for moving said carriage member in one direction, means including a second motor for moving said carriage member in a direction at right angles to said first direction, a plotting surface, a striker bar having a stylus affixed adjacent one end thereof, said stylus being positioned in proximity to said plotting surface, means connecting the other end of said striker bar to said carriage member including a resilient member tending to rotate said striker bar in such a direction as to maintain said stylus out of contact with said plotting surface, a plurality of signal inputs each of which comprises a first device for producing a first potential and a second device for producing a second potential, a first servomechanism including said first motor for positioning said motor in accordance with the potential applied to the input thereof, a second servomechanism including said second motor for positioning said second motor in accordance with the potential applied to the input of said second servomechanism and sequential switching means for selectively and sequentially applying a first and second potential of a selected signal input to the respective servomechanisms.

4. A device as set forth in claim 3 having additional means for projecting the indicia described on said plotting surface.

5. In a device of the character described, means for producing an electrical signal in accordance with position in one coordinate of direction, a first motor means, means for positioning said first motor means in accordance with said electrical signal, means for producing an electrical signal in accordance with position in another coordinate of direction, a second motor means, means for positioning said second motor means in accordance with said second mentioned signal, a plotting plate, a carriage member positioned adjacent to but exteriorly of the boundaries thereof, means for positioning said carriage member by the conjoint operation of said first and second motor means, an arm having one end fastened to said carriage member and the other end extending within the area of said plotting plate, a stylus carried by said last mentioned end engaging said plotting plate, and means for projecting the images inscribed on said plotting plate by said stylus.

6. In a device of the character described, means for producing an electrical signal in accordance with position in one coordinate of direction, a first motor means, means for positioning said first motor means in accordance with said electrical signal, means for producing an electrical signal in accordance with position in another coordinate of direction, a second motor means, means for positioning said second motor means in accordance with said second mentioned signal, a plotting plate, a carriage member positioned adjacent to but exteriorly of the boundaries thereof, means for positioning said carriage member by the conjoint operation of said first and second motor means, an arm having one end rotatably connected to said carriage member and the other end extending within the area of said plotting plate, a stylus carried by said last mentioned end, said arm being normally urged to a position out of the focal plane of said plotting plate with the stylus out of contact therewith, means for periodically rotating said arm to cause said stylus to engage said plotting plate and to inscribe a plot thereon, and means for projecting the plot so inscribed.

7. In a device of the character described, a plurality of pairs of input circuits each of which comprises means for producing a first electrical potential whose amplitude is a function of position in one coordinate of direction and means for producing a second electrical potential whose amplitude is a function of position in another coordinate of direction, a first motor, a first control circuit operable by a selected one of said first electrical potentials positioning said first motor in accordance with the amplitude of said selected first electrical potential, a second motor, a second control circuit operable by a selected one of said second electrical potentials positioning said second motor in accordance with the amplitude of said selected second electrical potential, means for sequentially and successively connecting respective ones of said pairs of input circuits to the respective first and second control circuits, a plotting plate, a carriage member positioned adjacent to but exteriorly of the boundaries thereof, means for positioning said carriage member by the conjoint operation of said first and second motors, an arm having one end rotatably connected to said carriage member and the other end extending within the area of said plotting plate, a stylus carried by said last mentioned end, said arm being normally urged to a position out of the focal plane of said plotting plate with said stylus out of contact therewith, means for periodically rotating said arm to cause said stylus to engage said plotting plate in timed relation to the operation of said sequential connecting means to inscribe a plurality of positional plots thereon, and means for projecting the plot so inscribed.

ARTHUR F. HAYEK.

REFERENCES CITED

The following references are of record in the file of this patent:

UNITED STATES PATENTS

| Number | Name | Date |
|---|---|---|
| 669,549 | Roche | Mar. 12, 1901 |
| 1,036,131 | Mayer | Aug. 20, 1912 |
| 1,262,180 | Davies | Apr. 9, 1918 |
| 1,319,820 | Williams | Oct. 28, 1919 |
| 1,545,674 | MacKay | July 14, 1925 |
| 1,718,742 | Korndorfer et al. | June 25, 1929 |
| 1,976,648 | Wittkuhns | Oct. 9, 1934 |
| 2,192,656 | Stone et al. | Mar. 5, 1940 |
| 2,292,119 | Hackenberg et al. | Aug. 4, 1942 |
| 2,309,117 | John | Jan. 26, 1943 |
| 2,369,284 | Dale | Feb. 13, 1945 |
| 2,373,989 | Wurger | Apr. 17, 1945 |
| 2,395,351 | Sohn | Feb. 19, 1946 |
| 2,421,077 | Miller | May 27, 1947 |
| 2,460,841 | Morey | Feb. 8, 1949 |
| 2,467,808 | Canada | Apr. 19, 1949 |
| 2,486,784 | Holden | Nov. 1, 1949 |